US011895477B2

(12) United States Patent
Kordon et al.

(10) Patent No.: US 11,895,477 B2
(45) **Date of Patent: *Feb. 6, 2024**

(54) METHODS AND APPARATUS FOR COMPRESSING AND DECOMPRESSING A HIGHER ORDER AMBISONICS REPRESENTATION

(71) Applicant: DOLBY LABORATORIES LICENSING CORPORATION, San Francisco, CA (US)

(72) Inventors: Sven Kordon, Wunstorf (DE); Alexander Krueger, Burgdorf (DE)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/700,390

(22) Filed: Mar. 21, 2022

(65) Prior Publication Data

US 2022/0225044 A1 Jul. 14, 2022

Related U.S. Application Data

(60) Continuation of application No. 17/244,746, filed on Apr. 29, 2021, now Pat. No. 11,284,210, which is a (Continued)

(30) Foreign Application Priority Data

Apr. 29, 2013 (EP) .................................... 13305558

(51) Int. Cl.
*H04S 3/00* (2006.01)
*G10L 19/008* (2013.01)

(52) U.S. Cl.
CPC ............ *H04S 3/008* (2013.01); *G10L 19/008* (2013.01); *H04S 2420/03* (2013.01); *H04S 2420/11* (2013.01); *H04S 2420/13* (2013.01)

(58) Field of Classification Search
CPC .. H04S 3/008; H04S 2420/03; H04S 2420/11; H04S 2420/13; H04S 3/00; G10L 19/008
(Continued)

(56) References Cited

U.S. PATENT DOCUMENTS 5,757,927 A 5/1998 Gerzon et al.
6,628,787 B1 9/2003 McGrath et al.
(Continued)

FOREIGN PATENT DOCUMENTS

CN 1495705 5/2004
CN 1511312 7/2004
(Continued)

OTHER PUBLICATIONS

Hellerud et al., "Encoding Higher Order Ambisonics with AAC", AES Convention, Amsterdam, May 17-20, 2008, pp. 1-8.
(Continued)

*Primary Examiner* — Yosef K Laekemariam

(57) ABSTRACT

Higher Order Ambisonics represents three-dimensional sound independent of a specific loudspeaker set-up. However, transmission of an HOA representation results in a very high bit rate. Therefore, compression with a fixed number of channels is used, in which directional and ambient signal components are processed differently. The ambient HOA component is represented by a minimum number of HOA coefficient sequences. The remaining channels contain either directional signals or additional coefficient sequences of the ambient HOA component, depending on what will result in optimum perceptual quality. This processing can change on a frame-by-frame basis.

6 Claims, 3 Drawing Sheets

Related U.S. Application Data division of application No. 16/841,203, filed on Apr. 6, 2020, now Pat. No. 10,999,688, which is a division of application No. 16/379,091, filed on Apr. 9, 2019, now Pat. No. 10,623,878, which is a division of application No. 15/876,442, filed on Jan. 22, 2018, now Pat. No. 10,264,382, which is a division of application No. 15/650,674, filed on Jul. 14, 2017, now Pat. No. 9,913,063, which is a continuation of application No. 14/787,978, filed as application No. PCT/EP2014/058380 on Apr. 24, 2014, now Pat. No. 9,736,607.

(58) Field of Classification Search
USPC ................................ 381/22, 23, 57, 92, 310
See application file for complete search history.

(56) References Cited

U.S. PATENT DOCUMENTS

| | | | | |
|---|---|---|---|---|
| 8,370,134 | B2 | 2/2013 | Briand | |
| 2005/0080616 | A1* | 4/2005 | Leung | H04R 5/027 704/200.1 |
| 2012/0155653 | A1* | 6/2012 | Jax | H04H 20/89 381/23 |

FOREIGN PATENT DOCUMENTS

| | | |
|---|---|---|
| CN | 1650348 | 8/2005 |
| CN | 1677490 | 10/2005 |
| CN | 1848241 | 10/2006 |
| CN | 102903366 | 1/2013 |
| EP | 2094032 | 8/2009 |
| EP | 2469741 | 6/2012 |
| EP | 2665208 | 11/2013 |
| EP | 2765791 | 8/2014 |
| JP | 2012133366 | 7/2012 |
| JP | 2013524564 | 6/2013 |
| JP | 2013545391 | 12/2013 |
| RU | 2011131868 | 2/2013 |
| WO | 2011117399 | 9/2011 |
| WO | 2012059385 | 5/2012 |
| WO | 2014090660 | 6/2014 |

OTHER PUBLICATIONS

Rafaely: "Plane-wave decomposition of the sound field on a sphere by spherical convolution", J. Acoust., Soc. Am., 4(116):pp. 2149-2157, Oct. 1, 2004.
Sun et al., "Optimal Higher Order Ambisonics Encoding with Predefined Constraints", IEEE Transactions on Audio, Speech and Language Processing, vol. 20, No. 3, Mar. 1, 2012; pp. 742-754.
Williams: "Fourier Acoustics", vol. 93 of Applied Mathematical Sciences. Academic Press, Jan. 1, 1999; Chapter 6; pp. 183-196.

* cited by examiner

METHODS AND APPARATUS FOR COMPRESSING AND DECOMPRESSING A HIGHER ORDER AMBISONICS REPRESENTATION

CROSS REFERENCE TO RELATED APPLICATIONS

This application is a continuation of Ser. No. 17/244,746 filed Apr. 29, 2021 which is a divisional of U.S. patent application Ser. No. 16/841,203, filed Apr. 6, 2020, now U.S. Pat. No. 10,999,688, which is a divisional of U.S. patent application Ser. No. 16/379,091, filed Apr. 9, 2019, now U.S. Pat. No. 10,623,878, which is a divisional of U.S. patent application Ser. No. 15/876,442, filed Jan. 22, 2018, now U.S. Pat. No. 10,264,382, which is a divisional of Ser. No. 15/650,674, filed Jul. 14, 2017, now U.S. Pat. No. 9,913,063, which is continuation of Ser. No. 14/787,978, filed Oct. 29, 2015, now U.S. Pat. No. 9,736,607, which is U.S. National Stage of International Application No. PCT/EP2014/058380, filed Apr. 24, 2014, which claims priority to European Patent Application No. 13305558.2, filed Apr. 29, 2013, each of which is incorporated by reference in its entirety.

TECHNICAL FIELD

The invention relates to a method and to an apparatus for compressing and decompressing a Higher Order Ambisonics representation by processing directional and ambient signal components differently.

BACKGROUND

Higher Order Ambisonics (HOA) offers one possibility to represent three-dimensional sound among other techniques like wave field synthesis (WFS) or channel based approaches like 22.2. In contrast to channel based methods, however, the HOA representation offers the advantage of being independent of a specific loudspeaker set-up. This flexibility, however, is at the expense of a decoding process which is required for the playback of the HOA representation on a particular loudspeaker set-up. Compared to the WFS approach, where the number of required loudspeakers is usually very large, HOA may also be rendered to set-ups consisting of only few loudspeakers. A further advantage of HOA is that the same representation can also be employed without any modification for binaural rendering to headphones.

HOA is based on the representation of the spatial density of complex harmonic plane wave amplitudes by a truncated Spherical Harmonics (SH) expansion. Each expansion coefficient is a function of angular frequency, which can be equivalently represented by a time domain function. Hence, without loss of generality, the complete HOA sound field representation actually can be assumed to consist of O time domain functions, where O denotes the number of expansion coefficients. These time domain functions will be equivalently referred to as HOA coefficient sequences or as HOA channels.

The spatial resolution of the HOA representation improves with a growing maximum order N of the expansion. Unfortunately, the number of expansion coefficients O grows quadratically with the order N, in particular $O=(N+1)^2$. For example, typical HOA representations using order N=4 require O=25 HOA (expansion) coefficients. According to the previously made considerations, the total bit rate for the transmission of HOA representation, given a desired single-channel sampling rate $f_s$ and the number of bits $N_b$ per sample, is determined by $O \cdot f_s \cdot N_b$. Consequently, transmitting an HOA representation of order N=4 with a sampling rate of $f_s$=48 kHz employing $N_b$=16 bits per sample results in a bit rate of 19.2 MBits/s, which is very high for many practical applications, e.g. for streaming.

Compression of HOA sound field representations is proposed in patent applications EP 12306569.0 and EP 12305537.8. Instead of perceptually coding each one of the HOA coefficient sequences individually, as it is performed e.g. in E. Hellerud, I. Burnett, A. Solvang and U. P. Svensson, "Encoding Higher Order Ambisonics with AAC", 124th AES Convention, Amsterdam, 2008, it is attempted to reduce the number of signals to be perceptually coded, in particular by performing a sound field analysis and decomposing the given HOA representation into a directional and a residual ambient component. The directional component is in general supposed to be represented by a small number of dominant directional signals which can be regarded as general plane wave functions. The order of the residual ambient HOA component is reduced because it is assumed that, after the extraction of the dominant directional signals, the lower-order HOA coefficients are carrying the most relevant information.

SUMMARY OF INVENTION

Altogether, by such operation the initial number $(N+1)^2$ of HOA coefficient sequences to be perceptually coded is reduced to a fixed number of D dominant directional signals and a number of $(N_{RED}+1)^2$ HOA coefficient sequences representing the residual ambient HOA component with a truncated order $N_{RED}<N$, whereby the number of signals to be coded is fixed, i.e. $D+(N_{RED}+1)^2$. In particular, this number is independent of the actually detected number $D_{ACT}(k) \leq D$ of active dominant directional sound sources in a time frame k. This means that in time frames k, where the actually detected number $D_{ACT}(k)$ of active dominant directional sound sources is smaller than the maximum allowed number D of directional signals, some or even all of the dominant directional signals to be perceptually coded are zero. Ultimately, this means that these channels are not used at all for capturing the relevant information of the sound field.

In this context, a further possibly weak point in the EP 12306569.0 and EP 12305537.8 processings is the criterion for the determination of the amount of active dominant directional signals in each time frame, because it is not attempted to determine an optimal amount of active dominant directional signals with respect to the successive perceptual coding of the sound field. For instance, in EP 12305537.8 the amount of dominant sound sources is estimated using a simple power criterion, namely by determining the dimension of the subspace of the inter-coefficients correlation matrix belonging to the greatest eigenvalues. In EP 12306569.0 an incremental detection of dominant directional sound sources is proposed, where a directional sound source is considered to be dominant if the power of the plane wave function from the respective direction is high enough with respect to the first directional signal. Using power based criteria like in EP 12306569.0 and EP 12305537.8 may lead to a directional-ambient decomposition which is suboptimal with respect to perceptual coding of the sound field.

A problem to be solved by the invention is to improve HOA compression by determining for a current HOA audio signal content how to assign to a predetermined reduced number of channels, directional signals and coefficients for the ambient HOA component.

The invention improves the compression processing proposed in EP 12306569.0 in two aspects. First, the bandwidth provided by the given number of channels to be perceptually coded is better exploited. In time frames where no dominant sound source signals are detected, the channels originally reserved for the dominant directional signals are used for capturing additional information about the ambient component, in the form of additional HOA coefficient sequences of the residual ambient HOA component. Second, having in mind the goal to exploit a given number of channels to perceptually code a given HOA sound field representation, the criterion for the determination of the amount of directional signals to be extracted from the HOA representation is adapted with respect to that purpose. The number of directional signals is determined such that the decoded and reconstructed HOA representation provides the lowest perceptible error. That criterion compares the modelling errors arising either from extracting a directional signal and using a HOA coefficient sequence less for describing the residual ambient HOA component, or arising from not extracting a directional signal and instead using an additional HOA coefficient sequence for describing the residual ambient HOA component. That criterion further considers for both cases the spatial power distribution of the quantisation noise introduced by the perceptual coding of the directional signals and the HOA coefficient sequences of the residual ambient HOA component.

In order to implement the above-described processing, before starting the HOA compression, a total number I of signals (channels) is specified compared to which the original number of O HOA coefficient sequences is reduced. The ambient HOA component is assumed to be represented by a minimum number $O_{RED}$ of HOA coefficient sequences. In some cases, that minimum number can be zero. The remaining $D=I-O_{RED}$ channels are supposed to contain either directional signals or additional coefficient sequences of the ambient HOA component, depending on what the directional signal extraction processing decides to be perceptually more meaningful. It is assumed that the assigning of either directional signals or ambient HOA component coefficient sequences to the remaining D channels can change on frame-by-frame basis. For reconstruction of the sound field at receiver side, information about the assignment is transmitted as extra side information.

In principle, the inventive compression method is suited for compressing using a fixed number of perceptual encodings a Higher Order Ambisonics representation of a sound field, denoted HOA, with input time frames of HOA coefficient sequences, said method including the following steps which are carried out on a frame-by-frame basis:

- for a current frame, estimating a set of dominant directions and a corresponding data set of indices of detected directional signals;
- decomposing the HOA coefficient sequences of said current frame into a non-fixed number of directional signals with respective directions contained in said set of dominant direction estimates and with a respective data set of indices of said directional signals, wherein said non-fixed number is smaller than said fixed number, and into a residual ambient HOA component that is represented by a reduced number of HOA coefficient sequences and a corresponding data set of indices of said reduced number of residual ambient HOA coefficient sequences, which reduced number corresponds to the difference between said fixed number and said non-fixed number;

- assigning said directional signals and the HOA coefficient sequences of said residual ambient HOA component to channels the number of which corresponds to said fixed number, wherein for said assigning said data set of indices of said directional signals and said data set of indices of said reduced number of residual ambient HOA coefficient sequences are used;
- perceptually encoding said channels of the related frame so as to provide an encoded compressed frame.

In principle the inventive compression apparatus is suited for compressing using a fixed number of perceptual encodings a Higher Order Ambisonics representation of a sound field, denoted HOA, with input time frames of HOA coefficient sequences, said apparatus carrying out a frame-by-frame based processing and including:

- means being adapted for estimating for a current frame a set of dominant directions and a corresponding data set of indices of detected directional signals;
- means being adapted for decomposing the HOA coefficient sequences of said current frame into a non-fixed number of directional signals with respective directions contained in said set of dominant direction estimates and with a respective data set of indices of said directional signals, wherein said non-fixed number is smaller than said fixed number, and into a residual ambient HOA component that is represented by a reduced number of HOA coefficient sequences and a corresponding data set of indices of said reduced number of residual ambient HOA coefficient sequences, which reduced number corresponds to the difference between said fixed number and said non-fixed number;

- means being adapted for assigning said directional signals and the HOA coefficient sequences of said residual ambient HOA component to channels the number of which corresponds to said fixed number, wherein for said assigning said data set of indices of said directional signals and said data set of indices of said reduced number of residual ambient HOA coefficient sequences are used;
- means being adapted for perceptually encoding said channels of the related frame so as to provide an encoded compressed frame.

In principle, the inventive decompression method is suited for decompressing a Higher Order Ambisonics representation compressed according to the above compression method, said decompressing including the steps:

- perceptually decoding a current encoded compressed frame so as to provide a perceptually decoded frame of channels;
- re-distributing said perceptually decoded frame of channels, using said data set of indices of detected directional signals and said data set of indices of the chosen ambient HOA coefficient sequences, so as to recreate the corresponding frame of directional signals and the corresponding frame of the residual ambient HOA component;
- re-composing a current decompressed frame of the HOA representation from said frame of directional signals and from said frame of the residual ambient HOA component, using said data set of indices of detected directional signals and said set of dominant direction estimates, wherein directional signals with respect to uniformly distributed directions are predicted from said directional signals, and thereafter said current decompressed frame is re-composed from said frame of directional signals, said predicted signals and said residual ambient HOA component.

In principle the inventive decompression apparatus is suited for decompressing a Higher Order Ambisonics representation compressed according to the above compression method, said apparatus including:

- means being adapted for perceptually decoding a current encoded compressed frame so as to provide a perceptually decoded frame of channels;
- means being adapted for re-distributing said perceptually decoded frame of channels, using said data set of indices of detected directional signals and said data set of indices of the chosen ambient HOA coefficient sequences, so as to recreate the corresponding frame of directional signals and the corresponding frame of the residual ambient HOA component;
- means being adapted for re-composing a current decompressed frame of the HOA representation from said frame of directional signals, said frame of the residual ambient HOA component, said data set of indices of detected directional signals, and said set of dominant direction estimates, wherein directional signals with respect to uniformly distributed directions are predicted from said directional signals, and thereafter said current decompressed frame is re-composed from said frame of directional signals, said predicted signals and said residual ambient HOA component.

In one example, a method for decompressing a compressed Higher Order Ambisonics representation, includes

- perceptually decoding a current encoded compressed frame to provide a perceptually decoded frame of channels;
- re-distributing said perceptually decoded frame of channels based on an assignment vector indicating at least an index of a possibly contained coefficient sequence of an ambient HOA component and a data set of indices of directional signals in order to determine a corresponding frame of the ambient HOA component;
- re-composing a current decompressed frame of the HOA representation from the recreated frame of directional signals and from the recreated frame of the ambient HOA component based on a data set of indices of detected directional signals and a set of dominant direction estimates,
- wherein directional signals with respect to uniformly distributed directions are predicted from said directional signals, and thereafter said current decompressed frame is re-composed from the recreated frame of directional signals, said predicted signals and said ambient HOA component.

In one example, an apparatus for decompressing a Higher Order Ambisonics representation compressed, said apparatus including:

- means adapted for perceptually decoding a current encoded compressed frame so as to provide a perceptually decoded frame of channels;
- means adapted for re-distributing said perceptually decoded frame of channels based on an assignment vector indicating at least an index of a possibly contained coefficient sequence of an ambient HOA component and a data set of indices of directional signals in order to determine a corresponding frame of the ambient HOA component;
- means adapted for re-composing a current decompressed frame of the HOA representation from the recreated frame of directional signals and from the recreated frame of the ambient HOA component based on a data set of indices of detected directional signals and a set of dominant direction estimates,
- wherein directional signals with respect to uniformly distributed directions are predicted from said directional signals, and thereafter said current decompressed frame is re-composed from the recreated frame of directional signals, said predicted signals and said ambient HOA component.

BRIEF DESCRIPTION OF DRAWINGS

Exemplary embodiments of the invention are described with reference to the accompanying drawings, which show in.

DESCRIPTION OF EMBODIMENTS

A. Improved HOA Compression

Figure 1:
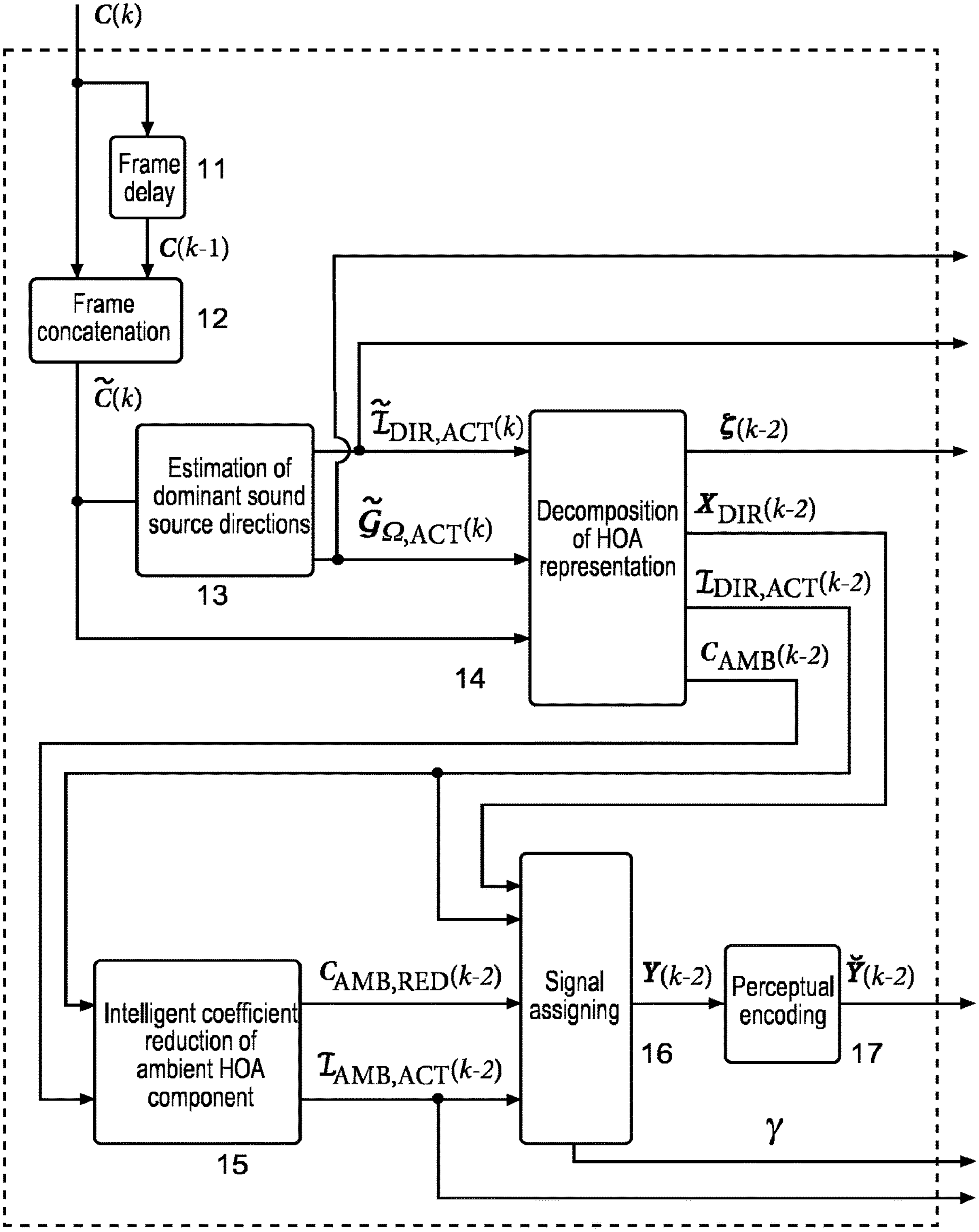
FIG. 1 illustrates block diagram for the HOA compression.

The compression processing according to the invention, which is based on EP 12306569.0, is illustrated in FIG. 1 where the signal processing blocks that have been modified or newly introduced compared to EP 12306569.0 are presented with a bold box, and where '$\mathcal{G}$' (direction estimates as such) and 'C' in this application correspond to 'A' (matrix of direction estimates) and 'D' in EP 12306569.0, respectively.

For the HOA compression a frame-wise processing with non-overlapping input frames C(k) of HOA coefficient sequences of length L is used, where k denotes the frame index. The frames are defined with respect to the HOA coefficient sequences specified in equation (45) as $$C(k) := [\, c((kL+1)T_S) \;\; c((kL+2)T_S) \;\; c((k+1)LT_S)\,], \tag{1}$$

where $T_s$ indicates the sampling period.

The first step or stage 11/12 in FIG. 1 is optional and consists of concatenating the non-overlapping k-th and the (k−1)-th frames of HOA coefficient sequences into a long frame $\tilde{C}(k)$ as $$\tilde{C}(k) := [\, C(k-1) \;\; C(k)\,], \tag{2}$$

which long frame is 50% overlapped with an adjacent long frame and which long frame is successively used for the estimation of dominant sound source directions. Similar to the notation for $\tilde{C}(k)$, the tilde symbol is used in the following description for indicating that the respective quantity refers to long overlapping frames. If step/stage 11/12 is not present, the tilde symbol has no specific meaning.

In principle, the estimation step or stage 13 of dominant sound sources is carried out as proposed in EP 13305156.5, but with an important modification. The modification is related to the determination of the amount of directions to be detected, i.e. how many directional signals are supposed to be extracted from the HOA representation. This is accomplished with the motivation to extract directional signals only if it is perceptually more relevant than using instead additional HOA coefficient sequences for better approximation of the ambient HOA component. A detailed description of this technique is given in section A.2.

The estimation provides a data set $\tilde{\mathcal{J}}_{DIR,ACT}(k) \subseteq \{1, \ldots, D\}$ of indices of directional signals that have been detected as well as the set $\tilde{\mathcal{G}}_{\Omega,ACT}(k)$ of corresponding direction estimates. D denotes the maximum number of directional signals that has to be set before starting the HOA compression.

In step or stage 14, the current (long) frame $\tilde{C}(k)$ of HOA coefficient sequences is decomposed (as proposed in EP 13305156.5) into a number of directional signals $X_{DIR}(k-2)$ belonging to the directions contained in the set $\tilde{\mathcal{G}}_{\Omega,ACT}(k)$, and a residual ambient HOA component $C_{AMB}(k-2)$. The delay of two frames is introduced as a result of overlap-add processing in order to obtain smooth signals. It is assumed that $X_{DIR}(k-2)$ is containing a total of D channels, of which however only those corresponding to the active directional signals are non-zero. The indices specifying these channels are assumed to be output in the data set $\mathcal{J}_{DIR,ACT}(k-2)$. Additionally, the decomposition in step/stage 14 provides some parameters $\zeta(k-2)$ which are used at decompression side for predicting portions of the original HOA representation from the directional signals (see EP 13305156.5 for more details).

In step or stage 15, the number of coefficients of the ambient HOA component $C_{AMB}(k-2)$ is intelligently reduced to contain only $O_{RED}+D-N_{DIR,ACT}(k-2)$ non-zero HOA coefficient sequences, where $N_{DIR,ACT}(k-2)=|\mathcal{J}_{DIR,ACT}(k-2)|$ indicates the cardinality of the data set $\mathcal{J}_{DIR,ACT}(k-2)$, i.e. the number of active directional signals in frame k−2. Since the ambient HOA component is assumed to be always represented by a minimum number $O_{RED}$ of HOA coefficient sequences, this problem can be actually reduced to the selection of the remaining $D-N_{DIR,ACT}(k-2)$ HOA coefficient sequences out of the possible $O-O_{RED}$ ones. In order to obtain a smooth reduced ambient HOA representation, this choice is accomplished such that, compared to the choice taken at the previous frame k−3, as few changes as possible will occur.

In particular, the three following cases are to be differentiated:

a) $N_{DIR,ACT}(k-2)=N_{DIR,ACT}(k-3)$: In this case the same HOA coefficient sequences are assumed to be selected as in frame k−3.

b) $N_{DIR,ACT}(k-2)<N_{DIR,ACT}(k-3)$: In this case, more HOA coefficient sequences than in the last frame k−3 can be used for representing the ambient HOA component in the current frame. Those HOA coefficient sequences that were selected in k−3 are assumed to be also selected in the current frame. The additional HOA coefficient sequences can be selected according to different criteria. For instance, selecting those HOA coefficient sequences in $C_{AMB}(k-2)$ with the highest average power, or selecting the HOA coefficients sequences with respect to their perceptual significance.

c) $N_{DIR,ACT}(k-2)>N_{DIR,ACT}(k-3)$: In this case, less HOA coefficient sequences than in the last frame k−3 can be used for representing the ambient HOA component in the current frame. The question to be answered here is which of the previously selected HOA coefficient sequences have to be deactivated. A reasonable solution is to deactivate those sequences which were assigned to the channels $i \in \mathcal{J}_{DIR,ACT}(k-2)$ at the signal assigning step or stage 16 at frame k−3.

For avoiding discontinuities at frame borders when additional HOA coefficient sequences are activated or deactivated, it is advantageous to smoothly fade in or out the respective signals.

The final ambient HOA representation with the reduced number of $O_{RED}+N_{DIR,ACT}(k-2)$non-zero coefficient sequences is denoted by $C_{AMB,RED}(k-2)$. The indices of the chosen ambient HOA coefficient sequences are output in the data set $\mathcal{J}_{AMB,ACT}(k-2)$.

In step/stage 16, the active directional signals contained in $X_{DIR}(k-2)$ and the HOA coefficient sequences contained in $C_{AMB,RED}(k-2)$ are assigned to the frame $Y(k-2)$ of I channels for individual perceptual encoding. To describe the signal assignment in more detail, the frames $X_{DIR}(k-2)$, $Y(k-2)$ and $C_{AMB,RED}(k-2)$ are assumed to consist of the individual signals $x_{DIR,d}(k-2)$, $d \in \{1, \ldots, D\}$, $y_i(k-2)$, $i \in \{1, \ldots, I\}$ and $c_{AMB,RED,o}(k-2)$, $o \in \{1, \ldots, 0\}$ as follows:

$$X_{DIR}(k-2) = \begin{bmatrix} x_{DIR,1}(k-2) \\ x_{DIR,2}(k-2) \\ \vdots \\ x_{DIR,D}(k-2) \end{bmatrix}, C_{AMB,RED}(k-2) = \begin{bmatrix} c_{AMB,RED,1}(k-2) \\ c_{AMB,RED,2}(k-2) \\ \vdots \\ c_{AMB,RED,O}(k-2) \end{bmatrix}, \quad (3)$$

$$Y(k-2) = \begin{bmatrix} y_1(k-2) \\ y_2(k-2 \\ \vdots \\ y_I(k-2) \end{bmatrix}.$$

The active directional signals are assigned such that they keep their channel indices in order to obtain continuous signals for the successive perceptual coding. This can be expressed by $$y_d(k-2) = x_{DIR,d}(k-2) \text{ for all } d \in \mathcal{J}_{DIR,ACT}(k-2). \quad (4)$$

The HOA coefficient sequences of the ambient component are assigned such the minimum number of $O_{RED}$ coefficient sequences is always contained in the last $O_{RED}$ signals of $Y(k-2)$, i.e.

$$y_{D+o}(k-2) = c_{AMB,RED,o}(k-2) \text{ for } 1 \le o \le O_{RED}. \quad (5)$$

For the additional $D-N_{DIR,ACT}(k-2)$ HOA coefficient sequences of the ambient component it is to be differentiated whether or not they were also selected in the previous frame:

a) If they were also selected to be transmitted in the previous frame, i.e. if the respective indices are also contained in data set $\mathcal{J}_{AMB,ACT}(k-3)$ the assignment of these coefficient sequences to the signals in $Y(k-2)$ is the same as for the previous frame. This operation assures smooth signals $y_i(k-2)$, which is favourable for the successive perceptual coding in step or stage 17.

b) Otherwise, if some coefficient sequences are newly selected, i.e. if their indices are contained in data set $\mathcal{J}_{AMB,ACT}(k-2)$ but not in data set $\mathcal{J}_{AMB,ACT}(k-3)$ they are first arranged with respect to their indices in an ascending order and are in this order assigned to channels $i \notin \mathcal{J}_{DIR,ACT}(k-2)$ of $Y(k-2)$ which are not yet occupied by directional signals.

This specific assignment offers the advantage that, during a HOA decompression process, the signal redistribution and composition can be performed without the knowledge about which ambient HOA coefficient sequence is contained in which channel of $Y(k-2)$. Instead, the assignment can be reconstructed during HOA decompression with the mere knowledge of the data sets $\mathcal{J}_{AMB,ACT}(k-2)$ and $\tilde{\mathcal{J}}_{DIR,ACT}(k)$.

Advantageously, this assigning operation also provides the assignment vector $\gamma(k) \in \mathbb{R}^{D-N_{DIR,ACT}(k-2)}$, whose elements $\gamma_o(k)$, $o=1, \ldots, D-N_{DIR,ACT}(k-2)$, denote the indices of each one of the additional $D-N_{DIR,ACT}(k-2)$ HOA coefficient sequences of the ambient component. To say it differently, the elements of the assignment vector $\gamma(k)$ provide information about which of the additional $O-O_{RED}$ HOA coefficient sequences of the ambient HOA component are assigned into the $D-N_{DIR,ACT}(k-2)$ channels with inactive directional signals. This vector can be transmitted additionally, but less frequently than by the frame rate, in order to allow for an initialisation of the re-distribution procedure performed for the HOA decompression (see section B). Perceptual coding step/stage 17 encodes the I channels of frame $Y(k-2)$ and outputs an encoded frame $\check{Y}(k-2)$.

For frames for which vector $\gamma(k)$ is not transmitted from step/stage 16, at decompression side the data parameter sets $\mathcal{J}_{DIR,ACT}(k)$ and $\mathcal{J}_{AMB,ACT}(k-2)$ instead of vector $\gamma(k)$ are used for the performing the re-distribution.

A.1 Estimation of the Dominant Sound Source Directions

Figure 2:
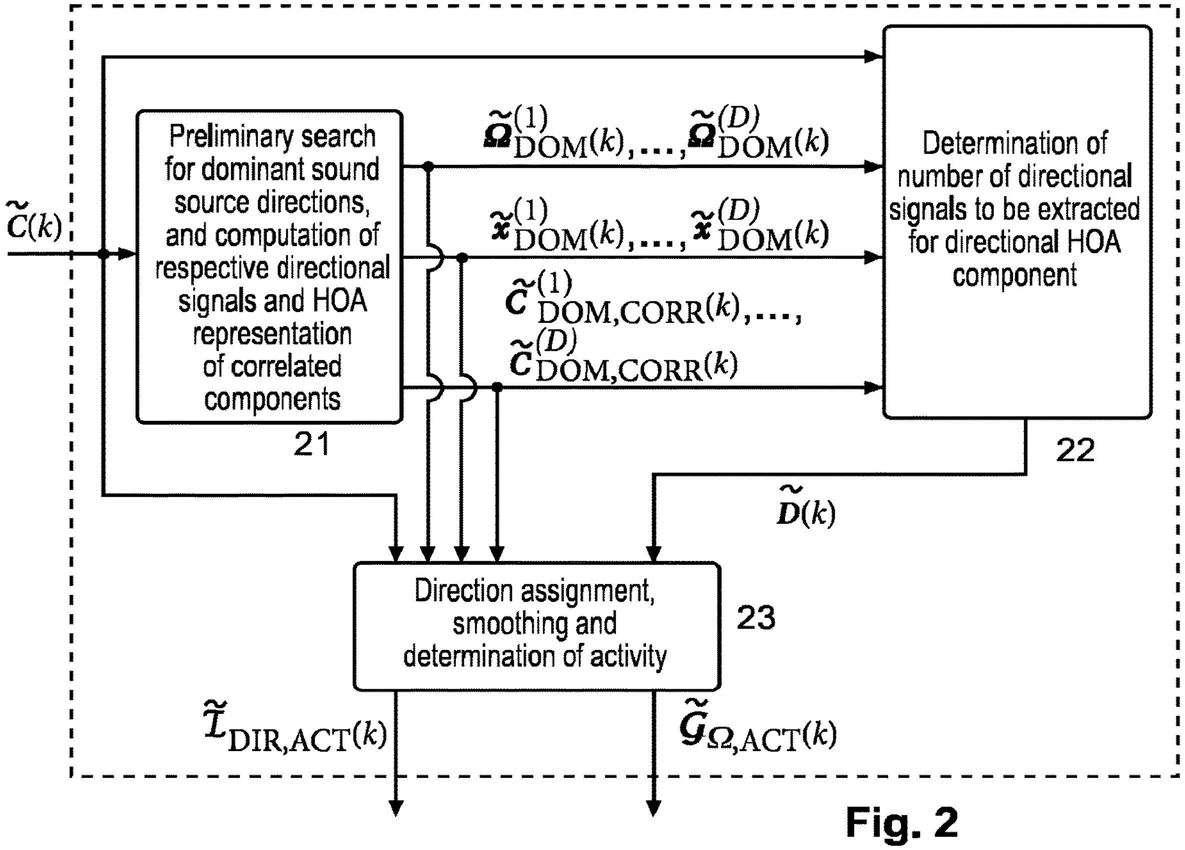
FIG. 2 illustrates estimation of dominant sound source directions.

The estimation step/stage 13 for dominant sound source directions of FIG. 1 is depicted in FIG. 2 in more detail. It is essentially performed according to that of EP 13305156.5, but with a decisive difference, which is the way of determining the amount of dominant sound sources, corresponding to the number of directional signals to be extracted from the given HOA representation. This number is significant because it is used for controlling whether the given HOA representation is better represented either by using more directional signals or instead by using more HOA coefficient sequences to better model the ambient HOA component.

The dominant sound source directions estimation starts in step or stage 21 with a preliminary search for the dominant sound source directions, using the long frame $\tilde{C}(k)$ of input HOA coefficient sequences. Along with the preliminary direction estimates $\tilde{\Omega}_{DOM}^{(d)}(k)$, $1 \le d \le D$, the corresponding directional signals $\tilde{x}_{DOM}^{(d)}(k)$ and the HOA sound field components $\tilde{C}_{DOM,CORR}^{(d)}(k)$, which are supposed to be created by the individual sound sources, are computed as described in EP 13305156.5. In step or stage 22, these quantities are used together with the frame $\tilde{C}(k)$ of input HOA coefficient sequences for determining the number $\tilde{D}(k)$ of directional signals to be extracted. Consequently, the direction estimates $\tilde{\Omega}_{DOM}^{(d)}(k)$, $\tilde{D}(k) < d \le D$, the corresponding directional signals $\tilde{x}_{DOM}^{(d)}(k)$, and HOA sound field components $\tilde{C}_{DOM,CORR}^{(d)}(k)$ are discarded. Instead, only the direction estimates $\tilde{\Omega}_{DOM}^{(d)}(k)$, $1 \le d \le \tilde{D}(k)$ are then assigned to previously found sound sources.

In step or stage 23, the resulting direction trajectories are smoothed according to a sound source movement model and it is determined which ones of the sound sources are supposed to be active (see EP 13305156.5). The last operation provides the set $\tilde{\mathcal{J}}_{DIR,ACT}(k)$ of indices of active directional sound sources and the set $\tilde{\mathcal{G}}_{\Omega ACT}(k)$ of the corresponding direction estimates.

A.2 Determination of Number of Extracted Directional Signals

For determining the number of directional signals in step/stage 22, the situation is assumed that there is a given total amount of I channels which are to be exploited for capturing the perceptually most relevant sound field information. Therefore, the number of directional signals to be extracted is determined, motivated by the question whether for the overall HOA compression/decompression quality the current HOA representation is represented better by using either more directional signals, or more HOA coefficient sequences for a better modelling of the ambient HOA component.

To derive in step/stage 22 a criterion for the determination of the number of directional sound sources to be extracted, which criterion is related to the human perception, it is taken into consideration that HOA compression is achieved in particular by the following two operations:

- reduction of HOA coefficient sequences for representing the ambient HOA component (which means reduction of the number of related channels);
- perceptual encoding of the directional signals and of the HOA coefficient sequences for representing the ambient HOA component.

Depending on the number M, $0 \le M \le D$, of extracted directional signals, the first operation results in the approximation $$\tilde{C}(k) \approx \tilde{C}^{(M)}(k) \tag{6}$$

$$:= \tilde{C}_{DIR}^{(M)}(k) + \tilde{C}_{AMB,RED}^{(M)}(k) \tag{7}$$

$$\text{where } \tilde{C}_{DIR}^{(M)}(k) := \sum_{d=1}^{M} \tilde{C}_{DOM,CORR}^{(d)}(k), \tag{8}$$

denotes the HOA representation of the directional component consisting of the HOA sound field components $\tilde{C}_{DOM,CORR}^{(d)}(k)$, $1 \le d \le M$, supposed to be created by the M individually considered sound sources, and $\tilde{C}_{AMB,RED}^{(M)}(k)$ denotes the HOA representation of the ambient component with only I−M non-zero HOA coefficient sequences.

The approximation from the second operation can be expressed by $$\tilde{C}(k) \approx \hat{\tilde{C}}^{(M)}(k) \tag{9}$$

$$:= \hat{\tilde{C}}_{DIR}^{(M)}(k) + \hat{\tilde{C}}_{AMB,RED}^{(M)}(k) \tag{10}$$

where $\hat{\tilde{C}}_{DIR}^{(M)}(k)$ and $\hat{\tilde{C}}_{AMB,RED}^{(M)}(k)$ denote the composed directional and ambient HOA components after perceptual decoding, respectively.

Formulation of Criterion

The number $\tilde{D}(k)$ of directional signals to be extracted is chosen such that the total approximation error $$\hat{\tilde{E}}^{(M)}(k) := \tilde{C}(k) - \hat{\tilde{C}}^{(M)}(k) \tag{11}$$

with $M=\tilde{D}(k)$ is as less significant as possible with respect to the human perception. To assure this, the directional power distribution of the total error for individual Bark scale critical bands is considered at a predefined number Q of test directions $\Omega_q$, q=1, . . . , Q, which are nearly uniformly distributed on the unit sphere. To be more specific, the directional power distribution for the b-th critical band, b=1, . . . , B, is represented by the vector $$\hat{\mathcal{P}}^{(M)}(k,b) := \left[\hat{\mathcal{P}}_1^{(M)}(k,b)\hat{\mathcal{P}}_2^{(M)}(k,b) \ldots \hat{\mathcal{P}}_Q^{(M)}(k,b)\right]^T, \tag{12}$$

whose components $\hat{\mathcal{P}}_q^{(M)}(k,b)$ denote the power of the total error $\hat{E}^{(M)}(k)$ related to the direction $\Omega_q$, the b-th Bark scale critical band and the k-th frame. The directional power distribution $\hat{\mathcal{P}}^{(M)}(k,b)$ of the total error $\hat{\hat{E}}^{(M)}(k)$ is compared with the directional perceptual masking power distribution $$\tilde{\mathcal{P}}_{MASK}(k,b) := \left[\tilde{P}_{MASK,1}(k,b) \;\; \tilde{P}_{MASK,2}(k,b) \;\; \ldots \;\; \tilde{P}_{MASK,Q}(k,b)\right]^T \tag{13}$$

due to the original HOA representation $\tilde{C}(k)$. Next, for each test direction $\Omega_q$ and critical band b the level of perception $\tilde{\mathcal{L}}_q^{(M)}(k,b)$ of the total error is computed. It is here essentially defined as the ratio of the directional power of the total error $\hat{\hat{E}}^{(M)}(k)$ and the directional masking power according to $$\tilde{\mathcal{L}}_q^{(M)}(k,b) := \max\left(0, \frac{\hat{\mathcal{P}}_q^{(M)}(k,b)}{\tilde{\mathcal{P}}_{MASK,q}(k,b)} - 1\right). \tag{14}$$

The subtraction of '1' and the successive maximum operation is performed to ensure that the perception level is zero, as long as the error power is below the masking threshold. Finally, the number $\tilde{D}(k)$ of directionals signals to be extracted can be chosen to minimise the average over all test directions of the maximum of the error perception level over all critical bands, i.e.

$$\tilde{D}(k) = \underset{M}{\operatorname{argmin}} \frac{1}{Q}\sum_{q=1}^{Q} \max_b \tilde{\mathcal{L}}_q^{(M)}(k,b). \tag{15}$$

It is noted that, alternatively, it is possible to replace the maximum by an averaging operation in equation (15).

Computation of the Directional Perceptual Masking Power Distribution

For the computation of the directional perceptual masking power distribution $\tilde{\mathcal{P}}_{MASK}(k,b)$ due to the original HOA representation $\tilde{C}(k)$, the latter is transformed to the spatial domain in order to be represented by general plane waves $\tilde{v}_q(k)$ impinging from the test directions $\Omega_q$, q=1, . . . , Q. When arranging the general plane wave signals $\tilde{v}_q(k)$ in the matrix $\tilde{V}(k)$ as $$\tilde{V}(k) = \begin{bmatrix} \tilde{v}_1(k) \\ \tilde{v}_2(k) \\ \vdots \\ \tilde{v}_Q(k) \end{bmatrix}, \tag{16}$$

the transformation to the spatial domain is expressed by the operation $$\tilde{V}(k),\Xi^T\tilde{C}(k), \tag{17}$$

where $\Xi$ denotes the mode matrix with respect to the test direction $\Omega_q$, q=1, . . . ,Q, defined by $$\Xi := [S_1 \;\; S_2 \;\; \ldots \;\; S_Q] \in \mathbb{R}^{O \times Q} \tag{18}$$

with $$S_q := [S_0^0(\Omega_q) \;\; S_{-1}^{-1}(\Omega_q) \;\; S_{-1}^{0}(\Omega_q) \;\; S_{-1}^{1}(\Omega_q) \;\; S_{-2}^{-2}(\Omega_q) \;\; \ldots \;\; S_N^N(\Omega_q)]^T \in \mathbb{R}^O. \tag{19}$$

The elements $\tilde{\mathcal{P}}_{MASK}(k,b)$ of the directional perceptual masking power distribution $\tilde{\mathcal{P}}_{MASK}(k,b)$, due to the original HOA representation $\tilde{C}(k)$, are corresponding to the masking powers of the general plane wave functions $\tilde{v}_q(k)$ for individual critical bands b.

Computation of Directional Power Distribution

In the following two alternatives for the computation of the directional power distribution $\hat{\hat{\mathcal{P}}}^{(M)}(k,b)$ are presented:

a. One possibility is to actually compute the approximation $\hat{\hat{C}}^{(M)}(k)$ of the desired HOA representation $\tilde{C}(k)$ by performing the two operations mentioned at the beginning of section A.2. Then the total approximation error $\hat{\hat{E}}^{(M)}(k)$ is computed according to equation (11). Next, the total approximation error $\hat{\hat{E}}^{(M)}(k)$ is transformed to the spatial domain in order to be represented by general plane waves $\hat{\hat{w}}_q^{(M)}(k)$ impinging from the test directions $\Omega_q$, q=1, . . . ,Q. Arranging the general plane wave signals in the matrix $\hat{\hat{W}}^{(M)}(k)$ as $$\hat{W}^{(M)}(k) = \begin{bmatrix} \hat{w}_1^{(M)}(k) \\ \hat{w}_2^{(M)}(k) \\ \vdots \\ \hat{w}_Q^{(M)}(k) \end{bmatrix}, \tag{20}$$

the transformation to the spatial domain is expressed by the operation $$\hat{\hat{W}}^{(M)}(k) = \Xi^T \hat{\hat{E}}^{(M)}(k). \tag{21}$$

The elements $\hat{\hat{\mathcal{P}}}_q^{(M)}(k,b)$ of the directional power distribution $\hat{\hat{\mathcal{P}}}^{(M)}(k,b)$ of the total approximation error $\hat{\hat{E}}^{(M)}(k)$ are obtained by computing the powers of the general plane wave functions $\hat{\hat{w}}_q^{(M)}(k)$, = 1, . . . ,Q, within individual critical bands b.

b. The alternative solution is to compute only the approximation $\tilde{C}^{(M)}(k)$ instead of $\hat{\hat{C}}^{(M)}(k)$. This method offers the advantage that the complicated perceptual coding of the individual signals needs not be carried out directly. Instead, it is sufficient to know the powers of the perceptual quantisation error within individual Bark scale critical bands. For this purpose, the total approximation error defined in equation (11) can be written as a sum of the three following approximation errors:

$$\tilde{E}^{(M)}(k) := \tilde{C}(k) - \tilde{C}^{(M)}(k) \quad (22)$$

$$\hat{\tilde{E}}^{(M)}_{DIR}(k) := \tilde{C}^{(M)}_{DIR}(k) - \hat{\tilde{C}}^{(M)}_{DIR}(k) \quad (23)$$

$$\hat{\tilde{E}}^{(M)}_{AMB,RED}(k) := \tilde{C}^{(M)}_{AMB,RED}(k) - \hat{\tilde{C}}^{(M)}_{AMB,RED}(k), \quad (24)$$

which can be assumed to be independent of each other. Due to this independence, the directional power distribution of the total error $\hat{\tilde{E}}^{(M)}(k)$ can be expressed as the sum of the directional power distributions of the three individual errors $\tilde{E}^{(M)}(k)$, $\hat{\tilde{E}}_{DIR}^{(M)}(k)$ and $\hat{\tilde{E}}_{AMB,RED}^{(M)}(k)$.

The following describes how to compute the directional power distributions of the three errors for individual Bark scale critical bands:

a. To compute the directional power distribution of the error $\tilde{E}^{(M)}(k)$, it is first transformed to the spatial domain by $$\tilde{W}^{(M)}(k) = \Xi^T \tilde{E}^{(M)}(k), \quad (25)$$

wherein the approximation error $\tilde{E}^{(M)}(k)$ is hence represented by general plane waves $\tilde{w}_q^{(M)}(k)$ impinging from the test directions $\Omega_q$, q=1, . . . ,Q, which are arranged in the matrix $\tilde{W}^{(M)}(k)$ according to $$\tilde{W}^{(M)}(k) = \begin{bmatrix} \tilde{w}_1^{(M)}(k) \\ \tilde{w}_2^{(M)}(k) \\ \vdots \\ \tilde{w}_Q^{(M)}(k) \end{bmatrix}. \quad (26)$$

Consequently, the elements $\tilde{\mathcal{P}}_q^{(M)}(k,b)$ of the directional power distribution $\tilde{\mathcal{P}}^{(M)}(k,b)$ of the approximation error $\tilde{E}^{(M)}(k)$ are obtained by computing the powers of the general plane wave functions $\tilde{w}_q^{(M)}(k)$, q=1, . . . , Q, within individual critical bands b.

b. For computing the directional power distribution $\hat{\tilde{\mathcal{P}}}_{DIR}^{(M)}(k,b)$ of the error $\hat{\tilde{E}}_{DIR}^{(M)}(k)$, it is to be borne in mind that this error is introduced into the directional HOA component $\tilde{C}_{DIR}^{(M)}(k)$ by perceptually coding the directional signals $\tilde{x}_{DOM}^{(d)}(k)$, 1≤d≤M. Further, it is to be considered that the directional HOA component is given by equation (8). Then for simplicity it is assumed that the HOA component $\tilde{C}_{DOM,CORR}^{(d)}(k)$ is equivalently represented in the spatial domain by 0 general plane wave functions $\tilde{v}_{GRID,o}^{(d)}(k)$, which are created from the directional signal $\tilde{x}_{DOM}^{(d)}(k)$ by a mere scaling, i.e.

$$\tilde{v}^{(d)}_{GRID,o}(k) = \alpha^{(d)}_o(k)\tilde{x}^{(d)}_{DOM}(k), \quad (27)$$

where $\alpha_o^{(d)}(k)$, o=1, . . . , 0, denote the scaling parameters. The respective plane wave directions $\tilde{\Omega}_{ROT,o}^{(d)}(k)$, o=1, . . . , 0, are assumed to be uniformly distributed on the unit sphere and rotated such that $\tilde{\Omega}_{ROT,1}^{(d)}(k)$ corresponds to the direction estimate $\tilde{\Omega}_{DOM}^{(d)}(k)$. Hence, the scaling parameter $\alpha_1^{(d)}(k)$ is equal to '1'.

When defining $\Xi_{GRID}^{(d)}(k)$ to be the mode matrix with respect to the rotated directions $\tilde{\Omega}_{ROT,o}^{(d)}(k)$, o=1, . . . , 0, and arranging all scaling parameters $\alpha_o^{(d)}(k)$ in a vector according to $$\alpha^{(d)}(k) := [\,1 \;\; \alpha^{(d)}_2(k) \;\; \alpha^{(d)}_3(k) \;\; \ldots \;\; \alpha^{(d)}_o(k)\,]^T \in \mathbb{R}^o, \quad (28)$$

the HOA component $\tilde{C}_{DOM,CORR}^{(d)}(k)$ can be written as $$\tilde{C}^{(d)}_{DOM,CORR}(k) = \Xi^{(d)}_{GRID}(k)\alpha^{(d)}(k)\tilde{x}^{(d)}_{DOM}(k). \quad (29)$$

Consequently, the error $\hat{\tilde{E}}_{DIR}^{(M)}(k)$ (see equation (23)) between the true directional HOA component $$\tilde{C}^{(M)}_{DIR}(k) = \sum_{d=1}^{M} \tilde{C}^{(d)}_{DOM,CORR}(k) \quad (30)$$

and that composed from the perceptually decoded directional signals $\hat{\tilde{x}}_{DOM}^{(d)}(k)$, d=1, . . . , M, by $$\hat{\tilde{C}}^{(M)}_{DIR}(k) = \sum_{d=1}^{M} \hat{\tilde{C}}^{(d)}_{DOM,CORR}(k) \quad (31)$$

$$:= \sum_{d=1}^{M} \Xi^{(d)}_{GRID}(k)\alpha^{(d)}(k)\hat{\tilde{x}}^{(d)}_{DOM}(k) \quad (32)$$

can be expressed in terms of the perceptual coding errors $$\hat{\tilde{e}}^{(d)}_{DOM}(k) := \tilde{x}^{(d)}_{DOM}(k) - \hat{\tilde{x}}^{(d)}_{DOM}(k) \quad (33)$$

in the individual directional signals by $$\hat{\tilde{E}}^{(M)}_{DIR}(k) = \sum_{d=1}^{M} \Xi^{(d)}_{GRID}(k)\alpha^{(d)}(k)\hat{\tilde{e}}^{(d)}_{DOM}(k). \quad (34)$$

The representation of the error $\hat{\tilde{E}}_{DIR}^{(M)}(k)$ in the spatial domain with respect to the test directions $\Omega_q$, q=1, . . . , Q, is given by $$\hat{\tilde{W}}^{(M)}_{DIR,q}(d) = \sum_{d=1}^{M} \underbrace{\Xi^T \Xi^{(d)}_{GRID}(k)\alpha^{(d)}(k)}_{=:\beta^{(d)}(k)}\hat{\tilde{e}}^{(d)}_{DOM}(k). \quad (35)$$

Denoting the elements of the vector $\beta^{(d)}(k)$ by $\beta_q^{(d)}(k)$, q=1, . . . , Q, and assuming the individual perceptual coding errors $\hat{\tilde{e}}_{DOM}^{(d)}(k)$, d=1, . . . , M, to be independent of each other, it follows from equation (35) that the elements $\hat{\tilde{\mathcal{P}}}_{DIR,q}^{(M)}(k,b)$ of the directional power distribution $\hat{\tilde{\mathcal{P}}}_{DIR}^{(M)}(k,b)$ of the perceptual coding error $\hat{\tilde{E}}_{DIR}^{(M)}(k)$ can be computed by $$\hat{P}_{DIR,q}^{(M)}(k,b) = \sum_{d=1}^{M} \left(\beta_q^{(d)}(k)\right)^2 \tilde{\sigma}_{DIR,d}^2(k,b). \tag{36}$$

$\tilde{\sigma}_{DIR,d}(k,b)$ is supposed to represent the power of the perceptual quantisation error within the b-th critical band in the directional signal $\hat{\tilde{x}}_{DOM}^{(d)}(k)$. This power can be assumed to correspond to the perceptual masking power of the directional signal $\tilde{x}_{DOM}^{(d)}(k)$.

c. For computing the directional power distribution $\hat{\tilde{\mathcal{P}}}_{AMB,RED}^{(M)}(k,b)$ of the error $\hat{\tilde{E}}_{AMB,RED}^{(M)}(k)$ resulting from the perceptual coding of the HOA coefficient sequences of the ambient HOA component, each HOA coefficient sequence is assumed to be coded independently. Hence, the errors introduced into the individual HOA coefficient sequences within each Bark scale critical band can be assumed to be uncorrelated. This means that the inter-coefficient correlation matrix of the error $\hat{\tilde{E}}_{AMB,RED}^{(M)}(k)$ with respect to each Bark scale critical band is diagonal, i.e.

$$\sum_{AMB,RED}^{(M)}(k,b) = \text{diag}\left(\tilde{\sigma}_{AMB,RED,1}^{2(M)}(k,b), \tilde{\sigma}_{AMB,RED,2}^{2(M)}(k,b), \ldots, \tilde{\sigma}_{AMB,RED,O}^{2(M)}(k,b)\right). \tag{37}$$

The elements $\tilde{\sigma}_{AMB,RED,o}^{2(M)}(k,b)$, o=1, . . . , 0, are supposed to represent the power of the perceptual quantisation error within the b-th critical band in the o-th coded HOA coefficient sequence in $\hat{\tilde{C}}_{AMB,RED}^{(M)}(k)$. They can be assumed to correspond to the perceptual masking power of the o-th HOA coefficient sequence $\tilde{C}_{AMB,RED}^{(M)}(k)$. The directional power distribution of the perceptual coding error $\hat{\tilde{E}}_{AMB,RED}^{(M)}(k)$ is thus computed by $$\hat{P}_{AMB,RED}^{(M)}(k,b) = = diag\left(\Xi^T \sum_{AMB,RED}^{(M)}(k,b)\Xi\right). \tag{38}$$

B. Improved HOA Decompression

Figure 3:
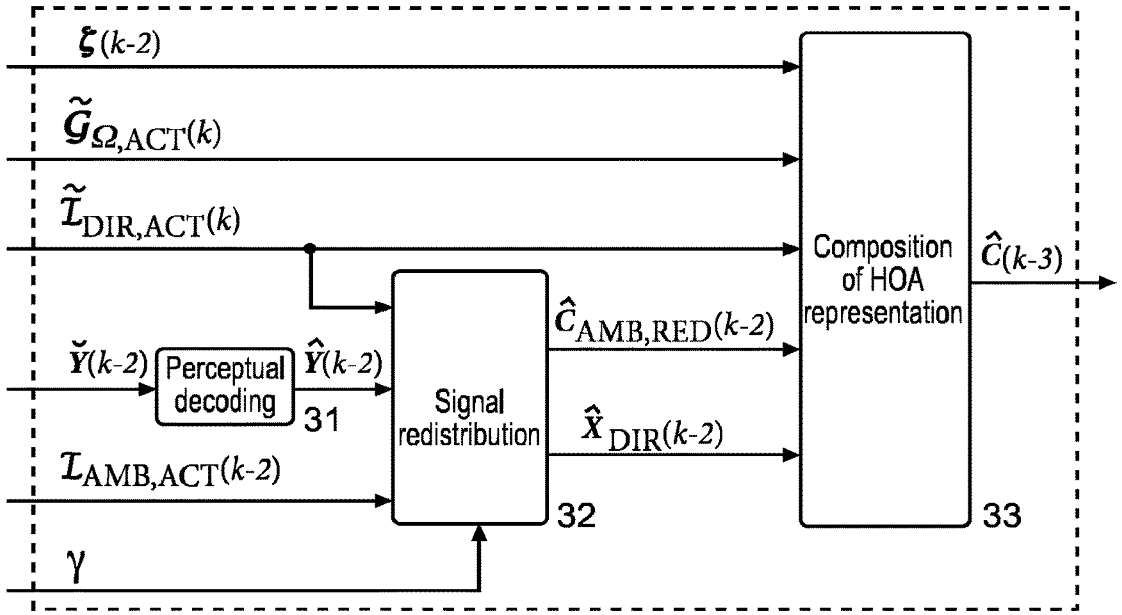
FIG. 3 illustrates block diagram for the HOA decompression.

The corresponding HOA decompression processing is depicted in FIG. 3 and includes the following steps or stages. In step or stage 31 a perceptual decoding of the I signals contained in $\breve{\boldsymbol{Y}}$ (k−2) is performed in order to obtain the I decoded signals in $\hat{Y}$(k−2).

In signal re-distributing step or stage 32, the perceptually decoded signals in $\hat{Y}$(k−2) are re-distributed in order to recreate the frame $\hat{X}_{DIR}$(k−2) of directional signals and the frame $\hat{C}_{AMB,RED}$(k−2) of the ambient HOA component. The information about how to re-distribute the signals is obtained by reproducing the assigning operation performed for the HOA compression, using the index data sets $\tilde{\mathcal{J}}_{DIR,ACT}$(k) and $\mathcal{J}_{AMB,ACT}$(k−2). Since this is a recursive procedure (see section A), the additionally transmitted assignment vector γ(k) can be used in order to allow for an initialisation of the re-distribution procedure, e.g. in case the transmission is breaking down.

Figure 4:
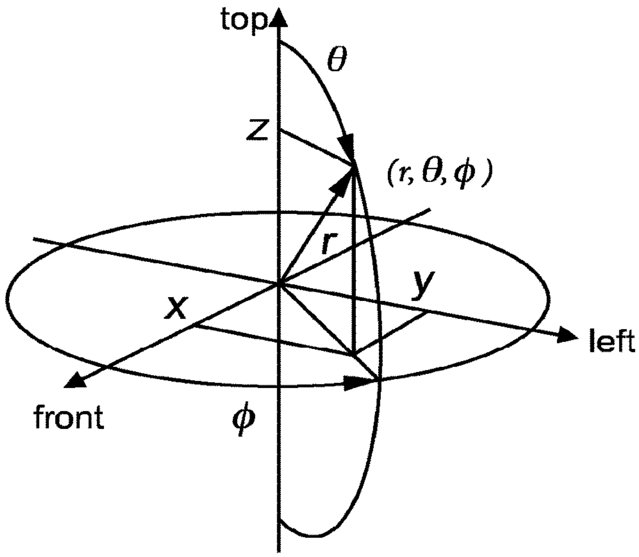
FIG. 4 illustrates spherical coordinate system.

In composition step or stage 33, a current frame $\hat{C}$(k−3) of the desired total HOA representation is re-composed (according to the processing described in connection with FIG. 2b and FIG. 4 of EP 12306569.0 using the frame $\hat{X}_{DIR}$(k−2) of the directional signals, the set $\tilde{\mathcal{J}}_{DIR,ACT}$(k) of the active directional signal indices together with the set $\tilde{\mathcal{G}}_{\Omega AcT}$(k) of the corresponding directions, the parameters ζ(k−2) for predicting portions of the HOA representation from the directional signals, and the frame $\hat{C}_{AMB,RED}$(k−2) of HOA coefficient sequences of the reduced ambient HOA component. $\hat{C}_{AMB,RED}$(k−2) corresponds to component $\hat{D}_A$(k−2) in EP 12306569.0, and $\tilde{\mathcal{G}}_{\Omega,ACT}$(k) and $\tilde{\mathcal{J}}_{DIR,ACT}$(k) correspond to $A_{\hat{\Omega}}$(k) in EP 12306569.0, wherein active directional signal indices are marked in the matrix elements of $A_{\hat{\Omega}}$(k). I.e., directional signals with respect to uniformly distributed directions are predicted from the directional signals ($\hat{X}_{DIR}$ (k−2)) using the received parameters (ζ(k−2)) for such prediction, and thereafter the current decompressed frame ($\hat{C}$(k−3)) is re-composed from the frame of directional signals ($\hat{X}_{DIR}$(k−2)), the predicted portions and the reduced ambient HOA component ($\hat{C}_{AMB,RED}$(k−2)).

C. Basics of Higher Order Ambisonics

Higher Order Ambisonics (HOA) is based on the description of a sound field within a compact area of interest, which is assumed to be free of sound sources. In that case the spatiotemporal behaviour of the sound pressure p(t,x) at time t and position x within the area of interest is physically fully determined by the homogeneous wave equation. In the following a spherical coordinate system as shown in FIG. 4 is assumed. In the used coordinate system, the x axis points to the frontal position, the y axis points to the left, and the z axis points to the top. A position in space $x=(r,\theta,\phi)^T$ is represented by a radius r>0 (i.e. the distance to the coordinate origin), an inclination angle θ∈[0, π] measured from the polar axis z and an azimuth angle ϕ∈[0,2π[ measured counter-clockwise in the x–y plane from the x axis. Further, $(\cdot)^T$ denotes the transposition.

It can be shown (see E. G. Williams, "Fourier Acoustics", volume 93 of Applied Mathematical Sciences, Academic Press, 1999) that the Fourier transform of the sound pressure with respect to time denoted by $\mathcal{F}_t(\cdot)$, i.e.

$$P(\omega, x) = \mathcal{F}_t(p(t, x)) = \int_{-\infty}^{\infty} p(t, x)e^{-i\omega t}dt, \tag{39}$$

with ω denoting the angular frequency and i indicating the imaginary unit, can be expanded into a series of Spherical Harmonics according to $$P(\omega = kc_s, r, \theta, \phi) = \sum_{n=0}^{n} \sum_{m=-n}^{n} A_n^m(k) j_n(kr) S_n^m(\theta, \phi). \tag{40}$$

In equation (40), $c_s$ denotes the speed of sound and k denotes the angular wave number, which is related to the angular frequency ω by $$k = \frac{\omega}{c_s}.$$

Further, $j_n(\cdot)$ the spherical Bessel functions of the first kind and $S_n^m(\theta\phi)$ denote the real valued Spherical Harmonics of order n and degree m, which are defined in below section C.1. The expansion coefficients $A_n^m(k)$ are depending only on the angular wave number k. In the foregoing it has been implicitly assumed that sound pressure is spatially band-limited. Thus, the series of Spherical Harmonics is truncated with respect to the order index n at an upper limit N, which is called the order of the HOA representation.

If the sound field is represented by a superposition of an infinite number of harmonic plane waves of different angular frequencies ω arriving from all possible directions specified by the angle tuple (θϕ), it can be shown (see B. Rafaely, "Plane-wave Decomposition of the Sound Field on a Sphere by Spherical Convolution", Journal of the Acoustical Society of America, vol. 4(116), pages 2149-2157, 2004) that the respective plane wave complex amplitude function C(ω, θϕ) can be expressed by the following Spherical Harmonics expansion $$C(\omega = kc_S,\ \theta,\ \phi) = \sum_{n=0}^{N}\sum_{m=-n}^{n} C_n^m(k)S_n^m(\theta,\ \phi), \tag{41}$$

where the expansion coefficients $C_n^m(k)$ are related to the expansion coefficients $$A_n^m(k) \text{ by } A_n^m(k) = 4\pi i^n C_n^m(k). \tag{42}$$

Assuming the individual coefficients $C_n^m(\omega=kc_s)$ to be functions of the angular frequency ω, the application of the inverse Fourier transform (denoted by $\mathcal{F}^{-1}(\cdot)$) provides time domain functions $$c_n^m(t) = \mathcal{F}_t^{-1}(C_n^m(\omega/c_s)) = \frac{1}{2\pi}\int_{-\infty}^{\infty} C_n^m\left(\frac{\omega}{c_s}\right)e^{i\omega t}d\omega \tag{43}$$

for each order n and degree m, which can be collected in a single vector c(t) by $$c(t) = [\,c_0^0(t)\ \ c_1^{-1}(t)\ \ c_1^0(t)\ \ c_1^1(t)\ \ c_2^{-2}(t)\ \ c_2^{-1}(t)\ \ c_2^0(t)\ \ c_2^1(t)\ \ c_2^2(t)\ \ \dots\ \ c_N^{N-1}(t)\ \ c_N^N(t)\,]^T. \tag{44}$$

The position index of a time domain function $c_n^m(t)$ within the vector c(t) is given by n(n+1)+1+m. The overall number of elements in vector c(t) is given by $O=(N+1)^2$.

The final Ambisonics format provides the sampled version of c(t) using a sampling frequency $f_s$ as $$\{c(lT_S)\}_{l\in\mathbb{N}} = \{c(T_S),\ c(2T_S),\ c(3T_S),\ c(4T_S),\ \dots\} \tag{45}$$

where $T_s=1/f_s$ denotes the sampling period. The elements of $c(lT_s)$ are here referred to as Ambisonics coefficients. The time domain signals $c_n^m(t)$ and hence the Ambisonics coefficients are real-valued.

C.1 Definition of Real-Valued Spherical Harmonics

The real-valued spherical harmonics $S_n^m(\theta, \phi)$ are given by $$S_n^m(\theta,\ \phi) = \sqrt{\frac{(2n+1)}{4\pi}\frac{(n-|m|)!}{(n+|m|)!}}\,P_{n,|m|}(\cos\theta)\,trg_m(\phi) \tag{46}$$

$$\text{with } trg_m(\phi) = \begin{cases} \sqrt{2}\cos(m\phi) & m > 0 \\ 1 & m = 0 \\ -\sqrt{2}\sin(m\phi) & m < 0 \end{cases}. \tag{47}$$

The associated Legendre functions $P_{n,m}(x)$ are defined as $$P_{n,m}(x) = (1-x^2)^{\frac{m}{2}}\frac{d^m}{dx^m}P_n(x),\ m \geq 0 \tag{48}$$

with the Legendre polynomial $P_n(x)$ and, unlike in the above-mentioned Williams article, without the Condon-Shortley phase term $(-1)^m$.

C.2 Spatial Resolution of Higher Order Ambisonics

A general plane wave function x(t) arriving from a direction $\Omega_0=(\theta_0, \phi_0)^T$ is represented in HOA by $$c_n^m(t) = x(t)S_n^m(\Omega_0),\ 0 \leq n \leq N,\ |m| \leq n. \tag{49}$$

The corresponding spatial density of plane wave amplitudes $c(t, \Omega) := \mathcal{F}_t^{-1}(C(\omega, \Omega))$ is given by $$c(t,\ \Omega) = \sum_{n=0}^{n}\sum_{m=-n}^{n} c_n^m(t)S_n^m(\Omega) \tag{50}$$

$$= x(t)\underbrace{\left[\sum_{n=0}^{n}\sum_{m=-n}^{n} S_n^m(\Omega_0)S_n^m(\Omega)\right]}_{v_N(\Theta)}. \tag{51}$$

It can be seen from equation (51) that it is a product of the general plane wave function x(t) and of a spatial dispersion function $v_N(\Theta)$, which can be shown to only depend on the angle Θ between Ω and $\Omega_0$ having the property $$\cos\Theta = \cos\theta\cos\theta_0 + \cos(\phi-\phi_0)\sin\theta\sin\theta_0. \tag{52}$$

As expected, in the limit of an infinite order, i.e., N→∞, the spatial dispersion function turns into a Dirac delta δ(·), i.e.

$$\lim_{N\to\infty} v_N(\Theta) = \frac{\delta(\Theta)}{2\pi}. \tag{53}$$

Figure 5:
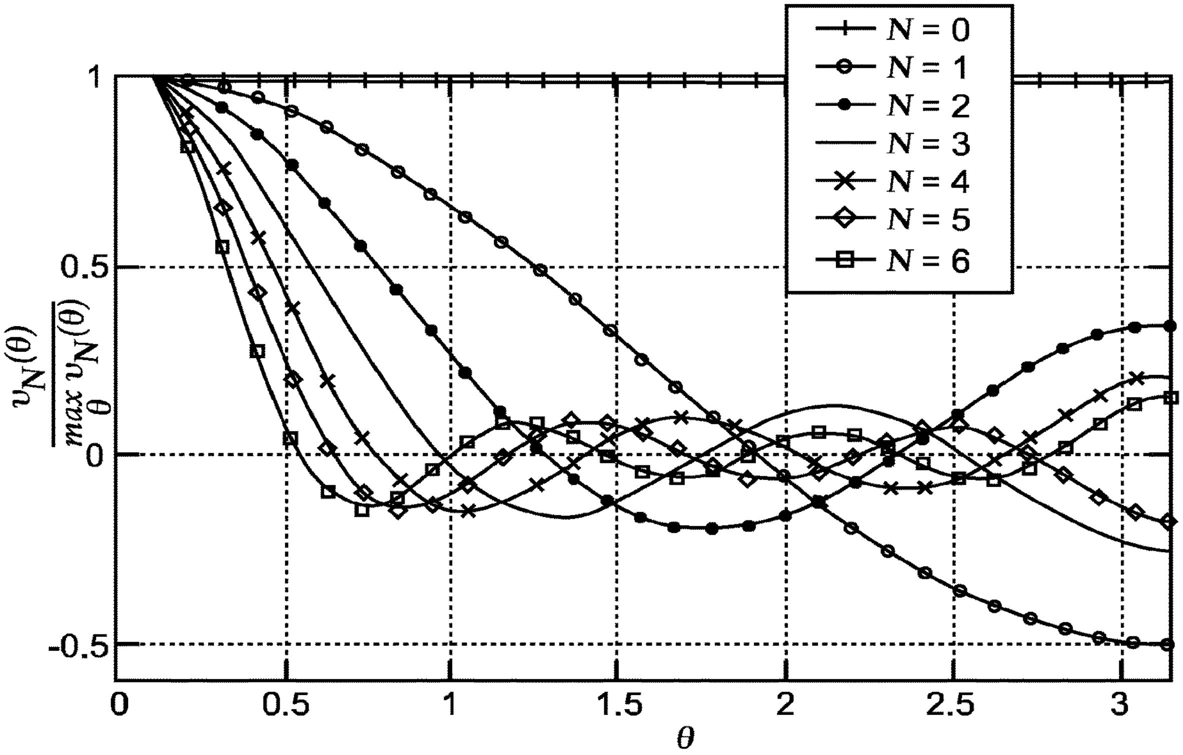
FIG. 5 illustrates normalised dispersion function $\nu_N(\Theta)$ for different Ambisonics orders N and for angles $\theta \in [0,\pi]$.

However, in the case of a finite order N, the contribution of the general plane wave from direction $\Omega_0$ is smeared to neighbouring directions, where the extent of the blurring decreases with an increasing order. A plot of the normalised function $v_N(\Theta)$ for different values of N is shown in FIG. 5.

It should be pointed out that for any direction $\Omega$ the time domain behaviour of the spatial density of plane wave amplitudes is a multiple of its behaviour at any other direction. In particular, the functions $c(t, \Omega_1)$ and $c(t, \Omega_2)$ for some fixed directions $\Omega$ and $\Omega_2$ are highly correlated with each other with respect to time t.

C.3 Spherical Harmonic Transform

If the spatial density of plane wave amplitudes is discretised at a number of 0 spatial directions $\Omega_o$, $1 \le o \le 0$, which are nearly uniformly distributed on the unit sphere, 0 directional signals $c(t, \Omega_o)$ are obtained. Collecting these signals into a vector as $$c_{SPAT}(t) := [c(t,\Omega_1) \ldots c(t,\Omega_0)]^T, \tag{54}$$

by using equation (50) it can be verified that this vector can be computed from the continuous Ambisonics representation d(t) defined in equation (44) by a simple matrix multiplication as $$c_{SPAT}(t) = \Psi^H c(t), \tag{55}$$

where $(\cdot)^H$ indicates the joint transposition and conjugation, and $\Psi$ denotes a mode-matrix defined by $$\Psi := [S_1 \; \ldots \; S_o] \tag{56}$$

with $$S_o := [S_0^0(\Omega_o) \;\; S_1^{-1}(\Omega_O) \;\; S_1^0(\Omega_O) \;\; S_1^1(\Omega_O) \;\; \ldots \;\; S_N^{N-1}(\Omega_o) \;\; S_N^N(\Omega_O)]. \tag{57}$$

Because the directions $\Omega_o$ are nearly uniformly distributed on the unit sphere, the mode matrix is invertible in general. Hence, the continuous Ambisonics representation can be computed from the directional signals $c(t, \Omega_o)$ by $$c(t) = \Psi^{-H} c_{SPAT}(t). \tag{58}$$

Both equations constitute a transform and an inverse transform between the Ambisonics representation and the spatial domain. These transforms are here called the Spherical Harmonic Transform and the inverse Spherical Harmonic Transform.

It should be noted that since the directions $\Omega_o$ are nearly uniformly distributed on the unit sphere, the approximation $$\Psi^H \approx \Psi^{-1} \tag{59}$$

is available, which justifies the use of $\Psi^{-1}$ instead of $\Psi^H$ in equation (55).

Advantageously, all the mentioned relations are valid for the discrete-time domain, too.

The inventive processing can be carried out by a single processor or electronic circuit, or by several processors or electronic circuits operating in parallel and/or operating on different parts of the inventive processing.

The invention claimed is:

1. A method for decompressing a compressed Higher Order Ambisonics (HOA) representation, the method comprising:

decoding the compressed HOA representation to provide a decoded frame of signals and an assignment vector indicating first indices of possibly contained coefficient sequence of ambient HOA components; wherein the assignment vector indicates first indices of possibly contained coefficient sequence of ambient HOA components relating to non-zero ambient HOA components;

determining a first set of indices indicating active directional signals of the decoded frame of signals, and respective directions of the active directional signals;

re-distributing the decoded frame of signals based on the first set of indices and the respective directions, wherein the re-distribution determines a frame of HOA directional signals and a frame of ambient HOA components;

outputting the frame of HOA directional signals; and outputting the frame of ambient HOA components.

2. The method of claim 1, wherein the frame of HOA directional is created based on the first set of indices.

3. A non-transitory computer readable storage medium containing instructions that when executed by a processor perform the method according to claim 1.

4. An apparatus for decompressing a Higher Order Ambisonics (HOA) representation, the apparatus comprising:

a decoder for decoding the compressed HOA representation to provide a decoded frame of signals and an assignment vector indicating first indices of possibly contained coefficient sequence of ambient HOA components; wherein the assignment vector indicates first indices of possibly contained coefficient sequence of ambient HOA components relating to non-zero ambient HOA components;

a first processor for determining a first set of indices indicating active directional signals of the decoded frame of signals, and respective directions of the active directional signals; a second processor for re-distributing the decoded frame of channels based on the first set of indices and the respective directions, wherein the re-distribution determines a frame of HOA directional signals and a frame of ambient HOA components; and a second processor for outputting the frame of HOA directional signals and for outputting the frame of ambient HOA components.

5. The method of claim 1, the wherein the first set of indices correspond with a set of corresponding direction estimates.

6. The method of claim 1, wherein the set of corresponding direction estimates correspond with energetically dominant components of the compressed HOA representation.

* * * * *